3,244,473
REDUCING AGENTS AND PROCESS FOR THEIR APPLICATION

Jacques Wegmann and Heinz Peter Schaub, Basel, and Alfred Litzler, Itingen, Switzerland, assignors to Ciba Limited, Basel, Switzerland, a company of Switzerland
No Drawing. Filed Sept. 9, 1963, Ser. No. 307,293
Claims priority, application Switzerland, Sept. 10, 1962, 10,691/62; Aug. 14, 1963, 10,023/63
8 Claims. (Cl. 8—34)

Many processes, particularly dyeing and printing with vat dyestuffs, require the use of a reducing agent that is virtually ineffective at room temperature but that exerts its reducing action at an elevated temperature. This applies, for example, to the various processes in which an unreduced vat dyestuff is applied to a fabric by padding or by some similar means and is then fixed by steaming or by some other heat treatment. Similar conditions obtain in the case of those printing processes in which the reducing agent, advantageously together with the requisite amount of sodium hydroxide solution is applied to the cloth after application of the color, and the dyestuff is subsequently reduced and fixed by steaming or some similar heat treatment. In such cases it is not of advantage to use hydrosulfite as in conventional vat-dyeing processes because its reducing action is diminished by atmospheric oxygen when the cloth is given a passage through air. Addition of the hydrosulfite, which is effective at room temperature, to a padding liquor containing a vat dyestuff would result in "ending" or a difference in the strength of the dyeing from one end of a batch to the other due to the affinity of the vat for the fibre.

A reducing agent with the aforesaid properties has, in fact, been available for many years, namely, sodium sulfoxylate formaldehyde, otherwise known as hydroxymethane sulfinic acid, which is marketed under the trade name "Rongalite." However, this reducing agent, which is widely used in ordinary vat printing, has the drawback that its reducing action is relatively slow in taking effect, even at elevated temperatures, which means that a relatively long steaming time is required to fix the dyestuff. This is undesirable in continuous processes, which are finding increasing use.

It is known that certain quinones, for example, anthraquinone, and anthraquinone sulfonic acids activate the sulfoxylate formaldehyde. However, activation in this manner has the undesirable effect of rendering the reducing agent active at room temperature, which makes for low stability of the reducing liquor.

The present invention is based on the observation that a reducing agent containing sulfoxylate formaldehyde and a nitroaryl compound, which is water-soluble because it contains an anionic substituent, possesses a number of unexpected advantages. The nitroaryl compound forming a constituent of the reducing agent may contain as aryl radical, for example, a naphthalene or stilbene radical or advantageously a benzene radical. Compounds having a higher molecular weight are also suitable. However, such a compound must be water-soluble, at least in the form of its sodium salt, which must be provided for, if necessary, by the presence of more than one anionic group imparting solubility in water. As anionic groups imparting soubility in water, special mention may be made of carboxyl or sulfonic acid groups bound to the nucleus, and also sulfato groups and phosphato groups. As examples there may be mentioned 4:4'-dinitrostilbene-2:2'-disulfonic acid, the mono- and di-nitronaphthalene sulfonic acids well known as dyestuff intermediates, nitrobenzoic acids, 2:4-dinitrobenzene-1-sulfonic acid, and 3-nitrobenzene-1-sulfonic acid, which is the simplest and cheapest.

The said nitroaryl compounds can be admixed with sulfoxylate fromaldehydes, preferably sodium sulfoxylate formaldehyde, in any desired manner, for example, in the form of their sodium salts. The mixture ratio can be varied within wide limits, either as desired or as required by the conditions obtaining. For example, sodium 3-nitrobenzene sulfonate is effective when added to sodium sulfoxylate formaldehyde in an amount as low as 1%, and an addition of as much as 50% by no means nullifies the reducing action of the sulfoxylate formaldehyde. For most purposes, an addition of about 2 to 30% or 5 to 30% should produce the best results.

The two components mentioned react with each other at room temperature, the reaction proceeding exceptionally slowly in an aqueous solution that is approximately neutral; thus, such mixtures exhibit good stability. The reaction also proceeds slowly at room temperature in liquors made strongly alkaline with sodium hydroxide, as are normally used for the purposes mentioned above, whereas at an elevated temperature the sulfoxylate formaldehyde is activated to such an extent that high-speed continuous processes are possible. The nature of the chemical mechanism underlying the activation has not yet been established. However, it is possible that, in a strongly alkaline medium, the formation of azoxy, azo and hydrazo compounds proceeds in such a manner that more strongly reduced steps in their turn again act as reducing agents. The surprising observation has been made that it is generally not necessary to use larger amounts of sulfoxylate formaldehyde than would normally be used without the addition of the nitroaryl compound, for example, about 50 grams per liter of padding liquor.

The reducing agents of the invention can be prepared in the form of stable mixtures and, if desired or required, they may contain a wide variety of additives, for example, wetting agents, dispersing agents, and the like. On the other hand, they may be prepared immediately prior to use by dissolving the components in the padding liquor.

Such reducing agents offer special advantages in dyeing and printing processes that make us of time-saving, highspeed continuous fixing operations, the main feature of which comprises heating the cloth after a final impregnating treatment while it is still damp. The heating can be effected, for example, by steaming, or by heating with the exclusion of air and, if desired or required, under slight superatmospheric pressure, as is the case in the so-called Monforts reactor. No matter which variation of these coloration processes is adopted, care must be taken to ensure that the material to be heated contains a vat dyestuff, the requisite amount of alkali, advantageously in the form of sodium hydroxide solution, and a reducing agent of the invention at the moment it is heated; the reagents may be applied at different steps prior to the heating, the precise steps at which application is effected depending on the effect desired.

The best known of these methods are the so-called two-phase or "flash ageing" process and the pad-steam process, which is similar. The general procedure in both methods of working is as follows: In the first operation, vat dyestuff is applied to the fabric in a suitable manner, for example, by padding or printing in the absence of alkali and reducing agent. In the second operation, generally after intermediate drying, the fabric is treated in such a manner that it takes up the total amount of chemicals required to bring about reduction and fixation of the vat dyestuff. The simplest way of achieving this is to pad the fabric with a liquor that contains the requisite alkali, preferably sodium hydroxide, and also the reducing agent. In the case of prints, care must be taken to ensure that the prints do not run when padded with the chemical liquor; this is done by using for the print paste thickening agents that coagulate during padding, either by the action of the sodium hydroxide alone or by the addition of a coagulant to the padding liquor, for example, borax.

Furthermore, the reducing agents of the invention, by virtue of their very slight reducing action at room temperature, make it possible to treat a fabric with a dispersion containing a finely divided vat dyestuff, a reducing agent of the invention and the requisite amount of alkali.

Finally, for special purposes, for example, discharge printing, it is possible to apply the sulfoxylate formaldehyde along with the vat dyestuff and to carry out the final impregnating treatment with an alkaline solution of a nitroaryl compound, which is water-soluble on account of its anionic substituent.

In dyeing processes of longer duration and in ordinary printing processes in which the prints are dried before steaming and are then steamed for 7 to 15 minutes, it is known to use oxidizing agents such, for example, as chlorates or nitrites, when working with dyestuffs that have a tendency towards overreduction. In this connection it has also been proposed to use nitroalkanes, for example, nitropropane, as oxidizing agent for the prevention of over-reduction. Quite apart from the totally different problem to which these previous proposals are related, the said nitroalkanes do not produce the in itself paradoxical increase in reactivity as do the nitroaryl compounds used in the present process.

The following examples illustrate the invention. Unless otherwise stated, the parts and percentages are by weight.

*Example 1*

A print paste of the following composition is prepared:

| | Parts |
|---|---|
| Trichlorinated dibenzanthrone | 35 |
| Chlorinated indanthrone | 35 |
| Water | 230 |
| Thickening | 700 |
| | 1000 |

The thickening is prepared by sprinkling 20 parts of locust bean flour into 450 parts of cold water. A preparation of 15 parts of wheat starch suspended in 515 parts of water is then added. The whole is boiled for 20 minutes, stirred until cold, and then 1 part of formaldehyde is added as preservative.

A cotton fabric is roller-printed or screen-printed with the above paste and then dried.

The dried prints are padded to a liquor uptake of 70 to 80% on a two-bowl padding mangle with a solution containing 50 parts of sodium sulfoxylate formaldehyde, 10 parts of sodium meta-nitrobenzene-sulfonate, 90 parts by volume of sodium hydroxide solution of 40% strength and 15 parts of borax per 1000 parts of water. Fixation is then carried out, without intermediate drying, for 30 seconds on a Monforts reactor at a drum temperature of 120° C. The prints thus fixed are rinsed, reoxidized in the usual manner with hydrogen peroxide and acetic acid, rinsed and dried. A blue print of good yield is obtained. A much weaker print is obtained when no sodium meta-nitrobenzene sulfonate is used.

Similarly good results are obtained when using only one part of sodium meta-nitrobenzene sulfonate instead of 10 parts.

*Example 2*

A print paste of the following composition is prepared:

| | Parts |
|---|---|
| Dimethoxydibenzanthrone | 15 |
| Water | 285 |
| Thickening described in Example 1 | 700 |
| | 1000 |

A cotton fabric is printed and dried as described in Example 1.

The dried prints are impregnated with a solution containing 50 parts of sodium sulfoxylate formaldehyde, 10 parts of 2:4-dinitrobenzene sulfonic acid, 90 parts by volume of sodium hydroxide solution of 40% strength and 15 parts of borax per 1000 parts of water. Fixation and further processing are carried out in the manner described in Example 1.

A green print is obtained that is much stronger than a print obtained without the use of 2:4-dinitrobenzene sulfonic acid.

*Example 3*

A cotton fabric is printed with the print paste described in Example 2 and dried.

The dried prints are impregnated in a bath containing 50 parts of sodium sulfoxylate formaldehyde, 20 parts of 4:4'-dinitrostilbene-2:2'-disulfonic acid, 90 parts by volume of sodium hydroxide solution of 40% strength and 15 parts of borax per 1000 parts of water. Fixation and further processing are carried out in the manner described in Example 1.

A green print is obtained that is much stronger than a print produced without 4:4'-dinitrostilbene-2:2'-disulfonic acid.

*Example 4*

A cotton fabric is printed with the print paste described in Example 2 and dried.

The dried prints are impregnated in a bath containing 50 parts of sodium sulfoxylate formaldehyde, 10 parts of nitrobenzoic acid, 90 parts by volume of sodium hydroxide solution of 40% strength and 15 parts of borax per 1000 parts of water. Fixation and further processing are carried out in the manner described in Example 1.

A green print is obtained that is much stronger than a print produced without nitrobenzoic acid.

*Example 5*

A cotton gaberdine fabric that has been scoured, bleached and dried is padded on a conventional two-bowl padding mangle (giving 60% expression) with a cold suspension comprising

| | Parts |
|---|---|
| Chlorinated isodibenzanthrone | 30 |
| Water | 970 |
| | 1000 | and then dried.

The padded fabric is then treated on a two-bowl padding mangle (60% expression) with the following cold solution:

| | Parts |
|---|---|
| Aqueous sodium hydroxide solution of 40% strength | 62 |
| Sodium sulfoxylate formaldehyde | 48 |
| Sodium nitrobenzene sulfonate | 12 |
| Water | 878 |
| | 1000 |

The fabric is then run through a continuous ager for 60 seconds at 95 to 105° C., during which operation the dyestuff is reduced.

The fabric is then oxidized, rinsed, acidified, rinsed and soaped at the boil in the usual manner.

A violet gaberdine fabric is obtained that exhibits no ending or listing.

*Example 6*

30 parts of the dyestuff given in Example 2 are dispersed in 800 parts of water. 50 parts of sodium sulfoxylate formaldehyde, 10 parts of sodium meta-nitrobenzene sulfonate and 40 parts of 10 N-sodium hydroxide are added and the whole is bulked to 1000 parts with water.

A mercerized cotton fabric is impregnated with this solution, squeezed to give a weight increase of 60%, and is then immediately steamed for 60 seconds in saturated steam at 95 to 99° C. The dyed fabric is reoxidized, rinsed and soaped in the usual manner. A strong, well-penetrated green dyeing is obtained.

*Example 7*

A cotton fabric is impregnated on a two-bowl padding mangle with a solution containing 20 parts of the dyestuff of the formula

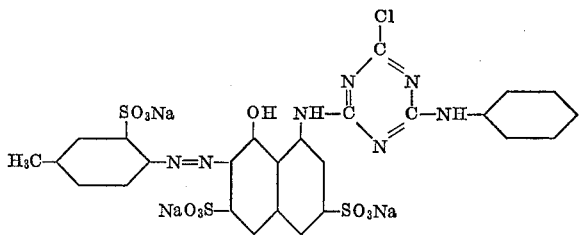

in 1000 parts of water and then dried. The liquor uptake is 80%.

This fabric is then printed with a print paste having the following composition:

| | Parts |
|---|---|
| Dimethoxydibenzanthrone | 60 |
| Thickening described in Example 1 | 800 |
| Sodium sulfoxylate formaldehyde | 100 |
| Water | 40 |
| | 1000 |

The dried print is impregnated on a two-bowl padding mangle with a solution containing 250 parts of sodium chloride, 90 parts of sodium hydroxide solution of 40% strength, 15 parts of borax and 10 parts of dinitrobenzene sulfonic acid per 1000 parts of water. The liquor uptake is 80%. Fixation and subsequent processing are carried out in the manner described in Example 1.

A green discharge print on a red ground is obtained, the print exhibiting a good yield. A much weaker print is obtained when the process is carried out without sodium dinitrobenzene sulfonate.

What is claimed is:

1. A reducing agent which essentially consists of an alkali metal formaldehyde sulfoxylate and, as a reducing promoter, of a nitroaryl compound which latter is water-soluble due to the presence of an anionic substitutent.

2. A reducing agent which essentially consists of an alkali metal formaldehyde sulfoxylate and of a nitrobenzene containing at least one sulfonic acid group in the benzene nucleus.

3. A reducing agent which consists essentially of sodium formaldehyde sulfoxylate and, as a reducing promoter, of sodium-meta-nitrobenzene sulfonate.

4. A reducing agent as claimed in claim 1 wherein the nitroaryl compound is present in an amount of 1 to 50 percent of the formaldehyde sulfoxylate.

5. A reducing agent as claimed in claim 1 wherein the nitroaryl compound is present in an amount of 2 to 30 percent of the formaldehyde sulfoxylate.

6. A method for dyeing textile cellulosic fibers by means of vat dyestuffs and by such methods as involve an impregnation treatment and a subsequent heating of the moist textile fibers wherein the textile fibers when leaving the impregnatioin treatment contain an alkali, a vat dyestuff and a reducing agent as claimed in claim 1.

7. A method for printing cellulosic fabrics which consists in printing the fabrics with a vat dyestuff and a thickening agent drying the fabric, impregnating the fabric with an aqueous solution containing an alkali and a reducing agent as claimed in claim 1 and heating the fabric.

8. A method for dyeing cellulosic fabrics which consists in impregnating the fabrics with a dispersion of a vat dystuff, drying the fabrics, impregnating the fabrics with an aqueous solution containing an alkali and a reducing agent as claimed in claim 1 and heating the fabrics.

References Cited by the Examiner

UNITED STATES PATENTS

| 2,827,357 | 3/1958 | Hannay et al. | 8—34 |
| 2,935,428 | 5/1960 | Huff | 252—188 X |
| 2,970,114 | 1/1961 | Bragdon | 252—188 |
| 2,995,522 | 8/1961 | Joyce | 252—188 X |
| 3,104,931 | 9/1963 | Casty et al. | 8—1.2 |
| 3,124,411 | 3/1964 | Panson et al. | 8—34 |
| 3,167,515 | 1/1965 | Hinckley et al. | 252—188 |

OTHER REFERENCES

Diserens, The Chemical Technology of Dyeing and Printing, Reinhold Publishing Corp., New York, page 151.

Fox, Vat Dyestuff and Vat Dyeing, 1947, John Wiley & Sons, Inc., New York, page 38.

J. TRAVIS BROWN, *Primary Examiner.*

NORMAN G. TORCHIN, *Examiner.*

T. J. HERBERT, *Assistant Examiner.*